(12) United States Patent
Tran et al.

(10) Patent No.: US 7,921,976 B2
(45) Date of Patent: Apr. 12, 2011

(54) OVERLOAD PROTECTION DEVICE

(75) Inventors: Sam Tran, Usingen (DE); Bodo Wagner, Niestetal (DE); Stephan Koch, Baunatal (DE); Siegfried Rotthäuser, Essen (DE)

(73) Assignee: Airbus Deutschland GmbH, Hamburg (DE)

( * ) Notice: Subject to any disclaimer, the term of this patent is extended or adjusted under 35 U.S.C. 154(b) by 445 days.

(21) Appl. No.: 12/028,374

(22) Filed: Feb. 8, 2008

(65) Prior Publication Data
US 2008/0210510 A1      Sep. 4, 2008

Related U.S. Application Data

(60) Provisional application No. 60/889,074, filed on Feb. 9, 2007.

(30) Foreign Application Priority Data

Feb. 9, 2007  (DE) .......................... 10 2007 006 539

(51) Int. Cl.
    *F16P 7/00*   (2006.01)
(52) U.S. Cl. ..................................... 192/150; 192/56.31
(58) Field of Classification Search ............... 192/56.31, 192/56.32; 100/346
    See application file for complete search history.

(56) References Cited

U.S. PATENT DOCUMENTS

| 3,426,873 | A | * | 2/1969 | Tezuka | 192/150 |
| 3,487,772 | A | * | 1/1970 | Kraft | 100/346 |
| 5,216,959 | A | * | 6/1993 | Hayashi | 83/13 |
| 5,964,124 | A | * | 10/1999 | Nunes et al. | 74/490.01 |

FOREIGN PATENT DOCUMENTS

| DE | 2242067 | 3/1974 |
| DE | 3702285 | 8/1988 |
| DE | 10229276 | 1/2004 |

* cited by examiner

*Primary Examiner* — Richard M. Lorence
(74) *Attorney, Agent, or Firm* — Wood, Herron & Evans, LLP

(57) ABSTRACT

The invention relates to an overload protection device which has a force-loaded or torque-loaded component, a chamber for receiving a fluid which is at a predetermined pressure, and at least two transmitting elements which are connected to said component in a force-transmitting manner. The transmitting elements serve to transmit a counter-force or a counter-torque, which is generated by the pressure acting upon said transmitting elements, to the component, and is, at the same time, part of a sealing arrangement which occludes an outlet of the chamber due to the fluid pressure. If the force or torque acting upon the component are greater than the counter-force or counter-torque resulting from the predetermined pressure, the sealing arrangement unblocks the outlet, as a result of which the pressure in the chamber drops below said predetermined pressure.

12 Claims, 1 Drawing Sheet

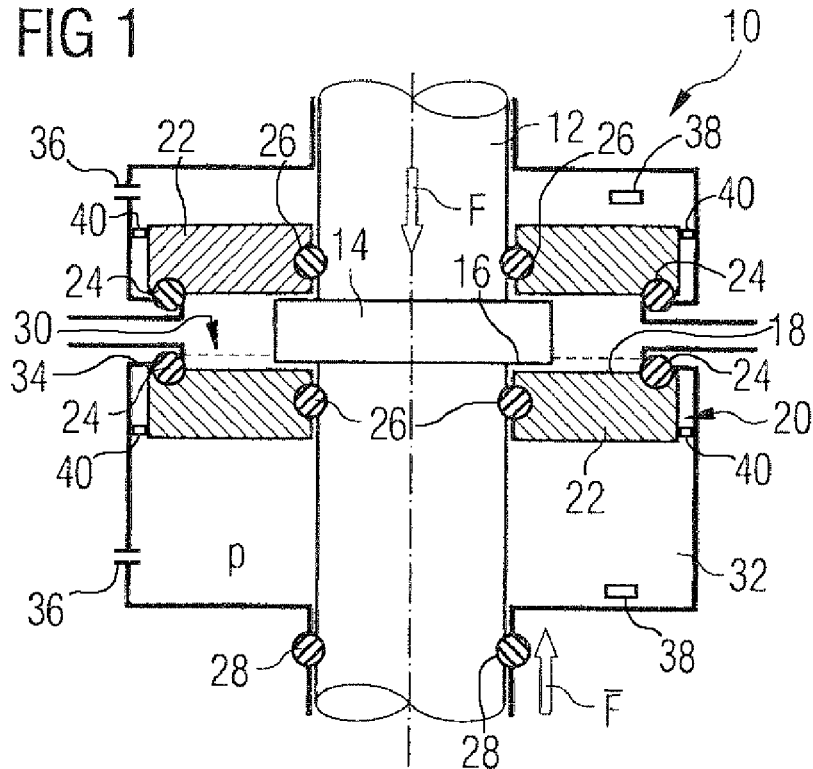
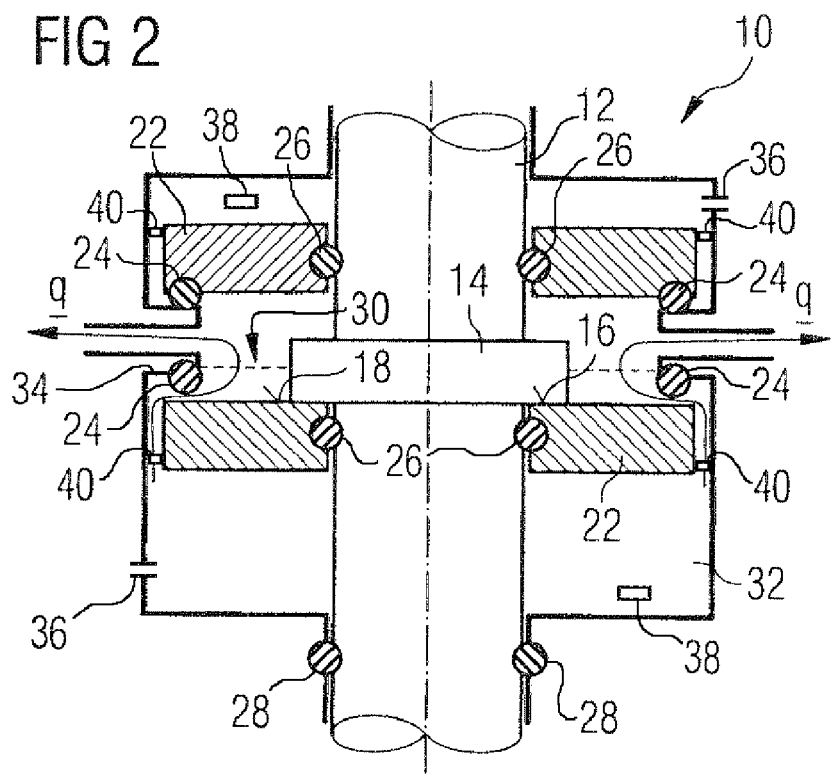

OVERLOAD PROTECTION DEVICE

This application claims priority to U.S. Provisional Patent Application No. 60/889,074, filed on Feb. 9, 2007; and/or German Patent Application No. 102007006539.8, filed on Feb. 9, 2007.

BACKGROUND OF THE INVENTION

The present invention relates to an overload protection device. Overload protection devices which have been known hitherto are used in the most diverse devices in which there is a transmission of force and/or momentum between two components, for example in presses in which an interruption of the movement of the force and/or momentum-transmitting component, for example the ram, is brought about in order to protect the recipient of the force and/or momentum against an overload in the form of excessively high forces and/or momentums, for example an excessively high to compressive force.

A solution of this kind is known from document DE 102 29 276 A1. This document describes a press in which the piston rod is provided with an overload protection device which arrests the ram if an admissible pressing force is exceeded. For this purpose, there is disposed within the piston rod, a pressure element which acts upon a cavity and upon a fluid located therein, when a compressive movement occurs. If the pressure exceeds a predetermined value, the pressurised fluid opens a pressure-limiting valve which is connected to the cavity via a line. The fluid flowing out triggers the decoupling of a flywheel belonging to the press, and also the actuation of a brake on the driving apparatus, in a valve-controlled manner and, in this way, interrupts the driving of the ram.

One object of the present invention consists in providing a simple and reliable overload protection device which has a high speed of response. Furthermore, the intention is to provide a device for protecting against overloads, whose response level can be adjusted within a wide range of values and which can be reused as often as desired.

SUMMARY OF THE INVENTION

This object is achieved by means of an overload protection device having the features indicated in claim 1. The device according to the invention has a force-loaded and/or momentum-loaded component, a chamber for receiving a fluid which is at a predetermined pressure, and at least one transmitting element which is connected to said component in a force-transmitting manner. Said transmitting element serves to transmit a counter-force and/or counter-momentum, which is generated by the pressure acting upon the transmitting element, to the component and is, at the same time, part of a sealing arrangement which occludes an outlet of the chamber by means of the fluid pressure. If the force and/or momentum acting upon the component is/are greater than the counter-force and/or counter-momentum resulting from the predetermined pressure, the sealing arrangement unblocks the outlet, as a result of which the pressure in the chamber drops below said predetermined pressure.

Under these circumstances, the overload protection device can be subjected to load in a sustained manner up to a set response level which depends upon the predetermined fluidic pressure. As long as the loading acting upon the overload protection device in the form of a force or momentum is not greater than the counter-force and/or counter-momentum resulting from the fluidic pressure, the transmitting element occludes the outlet of the chamber and, in this way, maintains the predetermined pressure inside said chamber. If, on the other hand, a loading, in the form of a force and/or a momentum, acting upon the overload protection device from outside exceeds the counter-force and/or counter-momentum resulting from the fluidic pressure, the transmitting element moves and unblocks the outlet. The fluid flows out of the chamber, a fact which leads to an immediate drop in pressure inside the chamber and a drop in the counter-force and/or counter-momentum resulting from said pressure. Since the recipient of the force and/or momentum can be acted upon only by a force and/or momentum which is as great as the counter-force and/or counter-momentum which has been built up, overloading of the recipient of the force and/or momentum is reliably prevented in this way.

The fact that, when the predetermined loading is exceeded, the overload protection device reduces the counter-force and/or counter-momentum directly, and does not, as is known from the prior art for example, actuate another device for interruption purposes, also guarantees very rapid and reliable response behaviour.

It is possible for the fluid used to be present both inside the chamber in a gaseous state and in a liquid state, or even in a diphasic state. It is thus possible to influence the response behaviour of the overload protection device by selecting the fluid and the associated degree of compressibility of said fluid. If use is made, for example, of a gaseous fluid, the drop in pressure takes place more slowly than if a liquid fluid is used.

According to a preferred configuration of the invention, each transmitting element is supported, in a sealing manner, on a sealing seat in the chamber, which seat is associated with the outlet. Provision may also be made, with respect to the transmission of force and/or momentum, for the component to be coupled to each transmitting element in a form-locking manner. Under these circumstances, the form-locking connection may be provided between the component and the transmitting element only in the direction of the force and/or momentum transmitted. The form-locking connection may be constructed in the most varied manner, for example with the aid of faces which bear against one another and interact in a form-locking manner when subjected to an operative compressive force, or by means of contoured portions which engage in one another and form a form-locking connection when subjected to an operative compressive moment, or the like.

Another embodiment of the invention makes provision for the component to be essentially plunger-shaped and to act, with its free end, upon the transmitting element. This embodiment is particularly advantageous if the overload protection device is to be triggered by compressive forces. Because of its simple construction, it is particularly cost-effective to manufacture. Thus, for example, it is necessary to dispose seals only between the associated sealing seat and the transmitting element and, in the case of this type of form-locking connection having two contact faces that bear against one another, tolerances with respect to shape and position are not relevant.

Another variant of embodiment of the invention makes provision for the component to extend through the transmitting element. Under these circumstances, provision may be made, particularly in connection with an embodiment of this kind, for the transmitting element to be annular. In an arrangement of this kind, the component penetrates into the chamber through the transmitting element, for which reason additional seals are needed between the transmitting element and the component. For the purpose of transmitting force and/or momentum to the transmitting element, the component may have a contoured portion, for example a shoulder, in order to guarantee a form-locking connection in the direction of the force and/or momentum. This variant of embodiment is particularly advantageous if the intention is to use more than one transmitting element in the overload protection device.

Thus, one further development of the invention makes provision for a number of transmitting elements to be present, of which at least some respond to forces and/or momentums from different directions. In this way, it is possible to produce, for example, a multi-stage overload protection device, by connecting the transmitting elements in series. Likewise, it is possible to use two mutually opposed transmitting elements, of which one is triggered by a force and/or momentum which is transmitted by the component and acts in one direction, while the other transmitting element is triggered by a force and/or momentum which is transmitted by the same component but acts in the opposite direction. Under these circumstances, separate chambers may be associated with the individual transmitting elements, but said chambers may also be associated with different outlet apertures belonging to a single chamber.

Provision may also be made for each transmitting element to be disposed so as to be displaceable relative to the component. This is particularly appropriate if a device such as has already been described above is intended for receiving forces and/or momentums which act in opposite directions. If the transmitting elements were rigidly connected to the component, two opposed transmitting elements would obstruct one another as a result of being supported on the sealing seat disposed at the outlet of the chamber, and would make it impossible to trigger the overload protection device in both the directions in which the forces and/or momentums act.

In order to guarantee that the overload protection device described above can be reused as often as desired, provision is also made for the chamber to have a separate fluid infeed aperture. It is thus possible, after the overload protection device has been triggered as a result of an overload and the fluid has passed out of the chamber, for said chamber to be refilled with fluid and for a predetermined fluid pressure to be set again in this way. Furthermore, it is also possible, depending upon the degree to which the chamber is filled, to increase the pressure inside said chamber by an additional infeed of fluid, and thus to even change the response level of the overload protection device.

Another possible way of making available the widest possible range of values for the response level, and of permitting adaptability of the overload protection device to the individual application in question, consists in equipping the device with a heating and/or cooling device for the fluid contained in the chamber. By regulating the temperature of the fluid contained in the chamber, its pressure is also changed. It is thus possible, with a predetermined filling of fluid, to increase the fluidic pressure inside the chamber by heating up the fluid, a fact which results in a higher response level on the part of the overload protection device. Since the pressure inside the chamber can be actively regulated at any time in this way, it is possible to adapt the response level even while the overload protection device is in operation.

One variant of construction of the invention makes provision for the outlet to interact with a throttle. A throttle of this type serves, above all, to damp the triggering operation of the overload protection device. Because of the extremely rapid response and direct action of the overload protection device, damage may, under certain circumstances, occur to the device for the protection of which said overload protection device was intended. By using a throttle which is mounted, for example, upstream of, downstream of or within the outlet, it is possible to reduce the speed of outflow of the fluid. By this means, the speed of operation of the overload protection device is diminished and the system correspondingly damped. A constructional design of the outlet is also possible which acts like a throttle in the way it functions and which reduces the flow of fluid and the speed of flow of the fluid flowing out.

One further development of the invention makes provision for the throttle to have an adjustable aperture. In this way, it is possible to adapt the throttling action, and thereby the speed with which the throttle belonging to the overload protection device operates, in dependence upon the individual application, even during operation. If the risk of possible damage to the installation as a whole is low, the throttling action can be reduced, that is to say the throttle aperture can be enlarged, so that the speed with which the overload protection device operates is increased. If, on the other hand, the risk of damage in the event of an immediate interruption of force is high, the throttle aperture can be reduced and the corresponding throttling action increased. The speed with which the overload protection device operates is then reduced and the system correspondingly damped in the event of an interruption in the transmission of a force and/or a momentum.

BRIEF DESCRIPTION OF THE DRAWINGS

The invention will be explained in an exemplary manner below, by means of the appended diagrammatic drawings in which:

FIG. 1 represents a diagrammatic, partially cut-away side view of an overload protection device according to the invention, in the non-loaded condition; and FIG. 2 represents a diagrammatic, partially cut-away side view of an overload protection device according to FIG. 1, in the triggered condition.

DETAILED DESCRIPTION

In FIG. 1, an exemplary embodiment of the overload protection device according to the invention is shown diagrammatically and in a partially cut-away side view, and is designated generally by the reference numeral 10. The device 10 comprises a component 12 which can be loaded by a force F, a chamber 32 which is filled with a fluid which is at a predetermined pressure p, and a sealing arrangement 20 for sealing off said chamber.

A transmitting element 22 on the one hand serves, as part of the sealing arrangement 20, to maintain the predetermined fluid pressure p operating in the chamber, and on the other hand transmits a counter-force F̄, which results from the pressure p and acts upon the transmitting element 22, to the component 12. As can be seen in FIG. 1, the transmitting element 22 is of annular construction in this case, and is supported, via a seal 24, on a sealing seat 34 which is constructed circumferentially on an aperture in the chamber, which aperture serves as an outlet 30 for the fluid. In the embodiment shown, the component 12 also extends into the chamber 32 through the aperture.

Since, in this embodiment, the component 12 penetrates both the transmitting element 22 and the chamber 32 on that side of the latter which lies opposite said transmitting element 22, seals 26 and 28 are mounted at the respective apertures. The seal 26 serves to receive the component 12 in a sealing manner in the transmitting element 22 which is displaceable relative to said component, while the seal 28 receives said component 12, which is displaceable relative to the chamber 32, in said chamber in a sealing manner. Outside the chamber 32, the component 12 has a shoulder 14 which, together with the annular transmitting element 22, forms, under the action of the force F, a form-locking connection which acts in the direction of said force F, and at the contact faces 16 and 18 of which the transmission of force takes place. The force-indicating arrow which is designated by F in FIG. 1 indicates the direction of the force F, under the effect of which the component 12 comes into communication with the transmitting element 22 in the event of loading. The force-indicating arrow F, on the other hand, indicates the direction of action of the counter-force F, which is based on the predetermined fluidic pressure p operating inside the chamber 32.

If the component 12 shown in FIG. 1 is loaded with a force F, for example a compressive force, the contact faces 16 and 18 of the component 12 and of the transmitting element 22 come into form-locking contact with one another. However, this form-locking connection operates only in the direction of the force F which is operating. As long as the force F is smaller than, or equal to, the counter-force F, the contact faces 16 and 18 bear against one another, but without the transmitting element 22 moving. If, however, the force F is greater than the counter-force F, the component 12 is displaced, together with the transmitting element 22, in the direction of the force F which is operating, so that the outlet 30 is unblocked, as is represented in FIG. 2. The fluid contained in the chamber 32 flows out of said chamber via the outlet 30, as is indicated by the flow-indicating arrows q. Since the counter-force F is also correspondingly reduced in a manner connected with the dropping fluidic pressure inside the chamber 32, the transmission of a force F is limited to the reduced counter-force F and an overload is prevented. Also as shown in FIGS. 1 and 2, the device 10 may include a number of mutually opposed transmitting elements 22 on opposite sides of the shoulder 14 such that the transmitting elements 22 are operable to respond to forces and torques in different directions (i.e., in opposing directions). Each of the mutually opposed transmitting elements 22 may include all of the features described above and below.

Following this, the chamber 32 can be filled with fluid again by means of a separate fluid infeed aperture 36, and can be used as an overload protection device again. Moreover, it is possible to influence the predetermined pressure p, and thereby the size of the counter-force F, by changing the filling quantity inside the chamber 32.

In addition, the overload protection device 10 may have a heating and/or cooling device 38 by means of which the fluid contained in the chamber 32 may be heated up or cooled down. In this way, the fluidic pressure inside said chamber 32 can be varied according to the individual application, even while the overload protection device 10 is in operation. The resulting counter-force F, and thereby the response level of the overload protection device 10, is also changed, as has already been mentioned, by adjusting the pressure p. It is possible to mount the heating and/or cooling device 38 both inside and outside the chamber 32.

That embodiment of an overload protection device 10 which has been represented is the obvious choice for safeguarding against forces, for example compressive forces. It may be used for protecting against overloads when momentums are operating, by connecting a simple additional element upstream for force-diverting purposes, or by using such an element as the component 12. Possibilities include, for example, a lever device with the aid of which the peripheral force of the torque can be directed, as an operative force, into the overload protection device 10, a thread with the aid of which a rotating movement triggered by a momentum can be converted into an axial movement, or comparable, known force-diverting elements. By using a throttle 40 which is mounted, for example, upstream of, downstream of or within the outlet 30, it is possible to reduce the speed of outflow of the fluid. By this means, the speed of operation of the overload protection device 10 is diminished and the system correspondingly damped.

The invention claimed is:

1. Overload protection device comprising:
    a force-loaded and/or torque-loaded component, and
    at least two transmitting elements, of which at least a first transmitting element responds to forces and/or torques in a different direction than at least a second transmitting element, each transmitting element having a chamber for receiving a fluid at a fluid pressure, and each transmitting element connected to said component in a force-transmitting manner, for transmitting a counter-force and/or counter-torque, which is generated by the fluid pressure acting upon the respective transmitting element, to the component,
    wherein each transmitting element is part of a sealing arrangement which occludes an outlet of the respective chamber due to the fluid pressure and which unblocks said outlet if the force and/or torque acting upon the component is/are higher than the counter-force and/or counter-torque resulting from the predetermined pressure, as a result of which the pressure in the respective chamber drops below said predetermined pressure.

2. Device according to claim 1,
    characterized in that each transmitting element is supported, in a sealing manner, on a sealing seat in the respective chamber, which seat is associated with the outlet.

3. Device according to claim 1, characterized in that the component is coupled to each transmitting element in a form-locking manner.

4. Device according to claim 1, characterized in that the component extends through the transmitting elements.

5. Device according to claim 4, characterized in that each transmitting element is annular.

6. Device according to claim 1, characterized in that each outlet comprises a plurality of openings.

7. Device according to claim 1, characterized in that each transmitting element is disposed so as to be displaceable relative to the component.

8. Device according to claim 1, characterized in that each chamber has a separate fluid infeed aperture.

9. Device according to claim 1, characterized by a heating and/or cooling device for the fluid contained in each chamber.

10. Device according to claim 1, characterized in that each outlet interacts with a throttle.

11. Device according to claim 10, characterized in that each throttle has an adjustable aperture.

12. Device according to claim 1, characterized in that the fluid is gaseous.

* * * * *